United States Patent [19]

Tom et al.

[11] Patent Number: 5,704,967
[45] Date of Patent: Jan. 6, 1998

[54] FLUID STORAGE AND DELIVERY SYSTEM COMPRISING HIGH WORK CAPACITY PHYSICAL SORBENT

[75] Inventors: Glenn M. Tom, New Milford; James V. McManus, Danbury, both of Conn.; W. Karl Olander, Tampa, Fla.

[73] Assignee: Advanced Technology Materials, Inc., Danbury, Conn.

[21] Appl. No.: 650,633

[22] Filed: May 20, 1996

Related U.S. Application Data

[63] Continuation-in-part of PCT/US95/13040, Oct. 13, 1995, and a continuation-in-part of Ser. No. 322,224, Oct. 13, 1995, Pat. No. 5,518,528.

[51] Int. Cl.$^6$ ............................................. B01D 53/04
[52] U.S. Cl. .............................. 96/143; 96/146; 96/147
[58] Field of Search ......................... 95/95, 96, 103, 95/106, 114, 115, 127, 131–133, 148, 902; 96/108, 121, 122, 126–128, 130–132, 143, 146, 147; 206/0.7

[56] References Cited

U.S. PATENT DOCUMENTS

| | | | |
|---|---|---|---|
| 240,423 | 4/1881 | James | 206/0.7 X |
| 1,608,155 | 11/1926 | Barnebey | 206/0.7 X |
| 1,714,245 | 5/1929 | Schaefer | 96/146 X |
| 2,356,334 | 8/1944 | Maude et al. | 206/0.7 X |
| 2,450,289 | 9/1948 | Marek | 96/146 X |
| 2,663,626 | 12/1953 | Spangler | 206/0.7 X |
| 2,987,139 | 6/1961 | Bush | 95/133 |
| 2,997,371 | 8/1961 | Wadsworth et al. | 95/131 X |
| 3,006,153 | 10/1961 | Cook | 206/0.7 X |
| 3,080,307 | 3/1963 | Rinald | 96/127 X |
| 3,093,564 | 6/1963 | Weisman et al. | 96/127 X |
| 3,116,132 | 12/1963 | Haller et al. | 95/132 |
| 3,144,200 | 8/1964 | Taylor et al. | 96/108 X |
| 3,264,803 | 8/1966 | Read | 96/146 X |
| 3,287,432 | 11/1966 | Sensel | 95/95 |
| 3,415,069 | 12/1968 | Hauser | 96/126 X |
| 3,469,375 | 9/1969 | Barrington et al. | 96/146 X |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,788,036 | 1/1974 | Lee et al. | 96/130 X |
| 4,023,701 | 5/1977 | Dockery | 206/0.7 X |
| 4,263,018 | 4/1981 | McCombs et al. | 96/130 X |
| 4,343,770 | 8/1982 | Simons | 206/0.7 X |
| 4,414,005 | 11/1983 | DeBiévre et al. | 95/127 |
| 4,578,256 | 3/1986 | Nishino et al. | 95/133 X |
| 4,723,967 | 2/1988 | Tom | 96/108 X |

(List continued on next page.)

FOREIGN PATENT DOCUMENTS

| | | | |
|---|---|---|---|
| 1095796 | 12/1960 | Germany | 95/133 |
| 2264512 | 1/1974 | Germany | 95/133 |
| 3139-781 | 4/1983 | Germany | 96/122 |
| 52-72373 | 6/1977 | Japan | 96/130 |
| 61-133116 | 6/1986 | Japan | 96/126 |
| 63-88017 | 4/1988 | Japan | 96/121 |
| 3-127606 | 5/1991 | Japan | 96/108 |
| 1181692A | 9/1985 | U.S.S.R. | 95/133 |
| 1544475A1 | 2/1990 | U.S.S.R. | 95/131 |
| 1583151A1 | 8/1990 | U.S.S.R. | 95/133 |

OTHER PUBLICATIONS

"Beaded carbon ups solvent recovery", *Chemical Engineering*, vol. 84, No. 18, pp. 39–40, Aug. 29, 1977.

*Primary Examiner*—Robert Spitzer
*Attorney, Agent, or Firm*—Steven J. Hultquist; Janet R. Elliott

[57] ABSTRACT

An adsorption-desorption apparatus, for storage and dispensing of a sorbable gas, wherein a physical sorbent medium bearing the adsorbed gas to be selectively dispensed is delivered by pressure differential desorption and/or thermal desorption of the sorbate gas from the sorbent material. The sorbent material preferably comprises a material which is characterized by a Sorbent Working Capacity, measured for arsine at 40 Torr and at 650 Torr, of at least 50 grams arsine per liter of bed of the sorbent material.

26 Claims, 8 Drawing Sheets

U.S. PATENT DOCUMENTS

| | | | |
|---|---|---|---|
| 4,738,693 | 4/1988 | Tom | 96/108 X |
| 4,738,694 | 4/1988 | Godino et al. | 96/126 X |
| 4,744,221 | 5/1988 | Knollmueller | 62/48 |
| 4,749,384 | 6/1988 | Nowobilski et al. | 96/108 X |
| 4,761,395 | 8/1988 | Tom et al. | 502/401 |
| 4,881,958 | 11/1989 | Eckardt et al. | 96/127 |
| 5,051,117 | 9/1991 | Prigge et al. | 95/95 |
| 5,089,244 | 2/1992 | Parent et al. | 95/133 X |
| 5,133,787 | 7/1992 | Diot et al. | 96/121 |
| 5,151,395 | 9/1992 | Tom | 502/67 |
| 5,202,096 | 4/1993 | Jain | 96/126 X |
| 5,238,469 | 8/1993 | Briesacher et al. | 96/126 X |
| 5,385,689 | 1/1995 | Tom et al. | 252/194 |
| 5,409,526 | 4/1995 | Zheng et al. | 96/132 |
| 5,417,742 | 5/1995 | Tamhankar et al. | 95/96 |
| 5,518,528 | 5/1996 | Tom et al. | 95/103 |

FLUID STORAGE AND DELIVERY SYSTEM COMPRISING HIGH WORK CAPACITY PHYSICAL SORBENT

CROSS-REFERENCE TO RELATED APPLICATIONS

This is a continuation-in-part of International Patent Application No. PCT/US95/13040 filed Oct. 13, 1995 designating the United States as a Designated State, based on and claiming the priority of U.S. patent application Ser. No. 08/322,224 filed Oct. 13, 1994, and issued May 21, 1996 as U.S. Pat. No. 5,518,528. This also is a continuation-in-part of U.S. patent application Ser. No. 08/322,224 filed Oct. 13, 1994, and issued May 21, 1996 as U.S. Pat. No. 5,518,528.

BACKGROUND OF THE INVENTION

1. Field of the Invention

This invention relates generally to storage and dispensing systems for the selective dispensing of fluids from a vessel or storage container in which the fluid component(s) are held in sorptive relationship to a solid sorbent medium, and are desorptively released from the sorbent medium in the dispensing operation.

2. Description of the Related Art

In a wide variety of industrial processes and applications, there is a need for a reliable source of process fluid(s).

Such process and application areas include semiconductor manufacturing, ion implantation, manufacture of flat panel displays, medical intervention and therapy, water treatment, emergency breathing equipment, welding operations, space-based delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency, as well as safety concerns.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, which overcomes the above-discussed disadvantages of the gas supply process disclosed in the Knollmueller patent. The gas storage and dispensing system of the Tom et al. patent comprises an adsorption-desorption apparatus, for storage and dispensing of a gas, e.g., a gas selected from the group consisting of hydride gases, halide gases, and organometallic Group V compounds, including: a storage and dispensing vessel constructed and arranged for holding a solid-phase physical sorbent medium, and for selectively flowing gas into and out of said vessel; a solid-phase physical sorbent medium disposed in said storage and dispensing vessel at an interior gas pressure; a sorbate gas physically adsorbed on the solid-phase physical sorbent medium; a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly; wherein the solid-phase physical sorbent medium is devoid of trace components such as water, metals, and oxidic transition metal species (e.g., oxides, sulfites and/or nitrates) which would otherwise decompose the sorbate gas in the storage and dispensing vessel.

By the elimination of such trace components from the solid-phase physical sorbent medium, the decomposition of the sorbate gas after 1 year at 25° C. and interior pressure conditions is maintained at extremely low levels, e.g., so that not more than 1–5% by weight of the sorbate gas is decomposed.

The storage and dispensing vessel of the Tom et al. patent thus embodies a substantial advance in the art, relative to the prior art use of high pressure gas cylinders. Conventional high pressure gas cylinders are susceptible to leakage from damaged or malfunctioning regulator assemblies, as well as to rupture if internal decomposition of the gas leads to rapid increasing interior gas pressure in the cylinder and the risk of cylinder rupture or other unwanted bulk release of gas from the cylinder.

The gas storage and dispensing vessel of the Tom et al. patent reduces the pressure of stored sorbate gases by reversibly adsorbing them onto a carrier sorbent medium such as a zeolite or activated carbon material. Other objects and advantages of the invention will be more fully apparent from the ensuing disclosure and appended claims.

There is a continuing need in the art to identify and utilize improved sorbent materials in fluid storage and delivery systems of the type hereinabove described, and it is accordingly an object of the present invention to provide a fluid storage and dispensing system utilizing a high efficiency sorbent material which offers significant advantages in cost, ease of use, and performance characteristics.

Other objects and advantages of the invention will be more fully apparent from the ensuing disclosure and appended claims.

SUMMARY OF THE INVENTION

The present invention contemplates a system for storage and dispensing of a sorbable fluid, e.g., a gas, vapor, liquid, multiphase fluid, etc., including fluid mixtures as well as single component fluids.

The fluid storage and dispensing system of the invention comprises a storage and dispensing vessel constructed and arranged for holding a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure, and fluid physically adsorbed on said solid-phase physical sorbent medium. A dispensing assembly is coupled in gas flow communication with the storage and dispensing vessel. The dispensing assembly may be constructed and arranged to provide, exteriorly of the storage and dispensing vessel, a pressure below the interior pressure, to effect desorption of fluid from the solid-phase physical sorbent medium, and fluid flow of desorbed fluid through the dispensing assembly. Alternatively, the storage and dispensing system may comprise means for selectively heating the sorbent material, to effect desorption of the fluid from the solid-phase physical sorbent medium, together with a dispensing assembly coupled in gas flow communication with the storage and dispensing vessel which is constructed and arranged to accommodate fluid flow of desorbed fluid through the dispensing assembly when thermally desorbed. As a still further alternative, the storage and dispensing system of the invention may be constructed and arranged to effect a combination of thermal and pressure differential desorption of the fluid from the solid-phase physical sorbent medium.

The dispensing assembly may comprise any appropriate conduits, pipes, tubing, flow channels, valving, instrumentation, monitoring means, flow regulators, pumps, blowers, aspirators, or the like, as appropriate to the specific end use application of the fluid storage and dispensing assembly of the present invention.

The invention in one aspect relates to a compact, portable, point-of-use fluid storage and dispensing system, containing physically adsorbed fluid on a high performance sorbent medium, at an interior pressure below 1200 Torr.

As used herein, the term "compact, portable, point-of-use source fluid storage and dispensing system" refers to a system as broadly described hereinabove in which the storage and dispensing vessel has an interior volume of from about 0.01 liter to about 20 liters.

The present invention achieves a major advance in the art in the provision of a true small-sized low pressure source of fluids, with the ability to fully replace high pressure fluid cylinders which have heretofore been used ubiquitously in gas-requiring applications of all types, e.g., for applications involving welding gases, anaesthesia gases, oxygen or oxygen-enriched breathing gases, semiconductor manufacturing gases, inert blanket gases such as nitrogen for suppressing combustion or chemical reaction, etc.

Particularly in industrial applications such as semiconductor manufacturing, where the amounts of reagent gases may be exceedingly small, e.g., for ion implantation, doping, etc., and very expensive, and where semiconductor manufacturing fabrication facilities are exceedingly compact and floor space is at a premium, the provision of a low pressure gas source is a major improvement over the current usage of high pressure gas cylinders with their attendant disadvantages.

The interior pressure in the sorbent-containing vessel of the low pressure storage and dispensing system of the invention is below about 1200 Torr. Preferably, the pressure is below 800 Torr, and most preferably below 700 Torr. By providing a sub-atmospheric pressure of the sorbed fluid in the storage and dispensing vessel, the risk of leaks and bulk dispersion of the sorbate fluid to the ambient environment is obviated, in contrast to the prior art practice where high pressure containment of the fluid entails a constant and significant risk, and corresponding safety and handling issues.

In another specific aspect, the present invention relates to a fluid storage and dispensing system of the type broadly described hereinabove, comprising a high work capacity sorbent material.

Performance characteristics applicable to sorbents in the storage and dispensing applications of the present invention include Sorbent Loading Capacity (amount of sorbate fluid which is storable on the sorbent, per unit weight of sorbent material), and Sorbent Working Capacity, $C_w$, defined as the weight of sorbate originally loaded on the sorbent material which is subsequently removable from the sorbent medium in the fluid dispensing operation, at given pressure and temperature conditions, per unit volume of the sorbent material, i.e., $$C_w = \text{[Weight of Sorbate} - \text{Weight of Sorbate Remaining After Description]}/\text{(Volume of Adsorbent)}$$

where weight of sorbate, and weight of sorbate remaining after desorption, are measured in grams, and adsorbent material volume is measured in liters. As used in such determination, the sorbent material volume is the volume of a bed of the sorbent material. The sorbent material is typically provided in pellet, particulate, extrudate, granular or other divided form, and the volume in the determination of working capacity therefore takes into account the packing density and void (interstitial space) volume of the sorbent material.

Another measure of the efficacy of carbon sorbent materials generally usefully employable in the broad practice of the invention is Percent Desorbable Sorbate of the sorbent material, defined as the percentage of the sorbate gas initially loaded on the sorbent material at 760 Torr which is subsequently desorbable solely by pressure desorption to 10 Torr, at 25° C., i.e., $$\text{Percent Desorbable Sorbate} = \{(\text{Weight of Sorbate} - \text{Weight of Sorbate Remaining After Desorption})/(\text{Weight of Sorbate})\} \times 100\%.$$

The Percent Desorbable Sorbate desirably is on the order of at least 15%, preferably at least 25%, more preferably at least 50%, and most preferably at least 60%.

Additionally, the sorbent material employed in the practice of the invention advantageously has the characteristic of readily sorbing the sorbate fluid in the first instance, at suitably high rate, and correspondingly releasing the previously sorbed fluid in a rapid manner in response to (1) a pressure differential between the interior volume of the storage and dispensing vessel and an exterior locus at lower pressure, and/or (2) heating of the sorbent, when the storage and dispensing system is in a fluid dispensing mode of operation.

Preferred sorbent materials useful in the fluid storage and dispensing system of the invention include materials having a pore volume (cumulative void volume) in the range of from about 0.1 to about 5.0 cubic centimeters of pore volume per gram of sorbent material, and preferably from about 0.5 to about 2.0 cubic centimeters of pore volume per gram of sorbent material.

The sorbent material desirably has a major fraction, i.e. more than 50% of its pore volume, comprised of pores having a diameter in the range of from about 2 Angstroms to 100 Angstroms, with preferably more than 80%, and most preferably substantially all of the pore volume of the sorbent, being in such range.

Preferred materials include sorbents having an average pore diameter in the range of from about 2 to about 20 Angstroms, and a major fraction of the pore volume within such range, more preferably more than 80%, and most preferably substantially all of its pore volume being in such range.

High performance sorbents useful in the broad practice of the present invention include those having a Sorbent Working Capacity, $C_w$, measured for arsine gas at 40 Torr and at 650 Torr, of at least 50, preferably at least 100, more preferably at least 150, and most preferably at least 200, grams of arsine per liter of sorbent material, measured as $C_w$=(Weight of amine gas, in grams, on one liter of sorbent at 650 Torr and 25° C.) —(Weight of arsine gas, in grams, on one liter of sorbent at 40 Torr and 25° C.)

where arsine is the reference fluid for such $C_w$ characterization and the liter basis of the sorbent, as mentioned, is the liter volume in bed form, including void or interstitial space, of a bed of the sorbent medium. It is to be noted in this respect that increased working capacity is possible by reducing the pressure to values as low as 1 Torr.

The sorbent materials useful in the fluid storage and dispensing system of the invention generally may have any suitable size, shape, and conformation, including beads, granules, pellets, tablets, powders, particulates, extrudates, cloth or web form materials, honeycomb matrix monolith, and composites (of the sorbent with other components), as well as comminuted or crushed forms of the foregoing conformations of sorbent materials.

The sorbent material may comprise any suitable material, including polymers (e.g., microporous TEFLON, macroreticulate polymers, glassy domain polymers, etc.), aluminum phosphosilicate (ALPOS), clays, zeolites, porous silicon, honeycomb matrix materials, carbon materials, etc.

Most preferred sorbent materials include zeolite sorbent materials and carbon sorbents. Among the preferred carbon sorbent materials, bead activated carbon materials, having a highly uniform spherical shape, with a particle size in the range of from about 0.1 millimeter to 1 centimeter diameter, and more desirably from about 0.25 to about 2 millimeters diameter, are most highly preferred.

In another aspect, again using arsine as the reference gas for the characterization, useful sorbent materials in the fluid storage and dispensing system of the invention comprise materials which have an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) of at least: |
|---|---|
| 25 | 30 |
| 50 | 62 |
| 100 | 105 |
| 200 | 145 |
| 300 | 168 |
| 400 | 177 |
| 500 | 185 |

| Pressure, Torr | Loading (grams of arsine per liter of sorbent) of at least: |
|---|---|
| 550 | 188 |
| 650 | 192 |

Although it generally is desirable that the sorbent materials employed in the storage and dispensing system of the invention have as high a loading characteristic as possible for the sorbent fluid which is to be stored thereon and subsequently dispensed from the sorbent, extremely high sorbent loading capacity may in some instances be disadvantageous from a heat of sorption standpoint, in respect of the manufacture of the storage and dispensing system. The sorption of the sorbable fluid on the sorbent is typically exothermic. For gases such as arsine and phosphine, the exotherm, depending on the fill rate of the gas onto the sorbent, may entail temperature rises on the order of 100° C. or more. Accordingly, it may be desirable to utilize a sorbent medium having high sorptive capacity within a range which does not entail a large heat of adsorption effect during the initial loading of the sorbent medium with the fluid that is to be stored on the sorbent for subsequent dispensing.

Accordingly, sorbent materials useful in the practice of the invention may include materials having an adsorption isotherm for arsine gas, at 25° C., measured as grams of arsine adsorbed per liter of the sorbent, as a function of pressure in Torr, which is within the adsorption isotherm range bounded by curves $G_1$ and $G_0$ in FIG. 1. Such sorbent materials have the following sorbent loading characteristics.

| Pressure, Torr | Loading (grams of arsine per liter of sorbent): |
|---|---|
| 25 | 30–106 |
| 50 | 62–138 |
| 100 | 105–185 |
| 200 | 145–232 |
| 300 | 168–263 |
| 400 | 177–288 |
| 500 | 185–308 |
| 550 | 188–315 |
| 650 | 192–330 |

Sorbents employable in the fluid storage and dispensing system of the invention desirably may be sorbents characterizable by any suitable combination or permutation of sorbent characteristics variously described hereinabove.

The invention in one aspect contemplates a compact, portable, point-of-use fluid storage and dispensing adsorption-desorption apparatus, for storage and dispensing of a fluid, comprising:

a storage and dispensing vessel constructed and arranged for holding a solid-phase physical sorbent medium, and for selectively flowing fluid into and out of the vessel;

a sorbent material disposed in the storage and dispensing vessel at an interior fluid pressure below 1200 Torr;

a sorbate fluid physically adsorbed on the sorbent material;

a dispensing assembly coupled in gas flow communication with the storage and dispensing vessel, and constructed and arranged for selective on-demand dispensing of desorbed fluid, after thermal and/or pressure differential-mediated desorption of the fluid from the carbon sorbent material, with the dispensing assembly being constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

The sorbent material desirably is devoid of trace components, such as those selected from the group consisting of water, metals, and oxidic transition metal species (e.g., oxides, sulfites and/or nitrates), sufficient in concentration to decompose the sorbate fluid in the storage and dispensing vessel.

Preferred carbon sorbents in the practice of the invention may also be specified in terms of their ash content. Preferred carbons have ash content less than about 7%, preferably less than about 5%, and most preferably less than about 0.1%. Various carbon sorbents have ash content as high as 15%. The ash content can vary widely depending on the source of the specific carbon material.

Ash is an inorganic material, including constituents such as silica which can be detrimental in applications involving sorbable fluids such as hydrogen fluoride and boron trifluoride, which will irreversibly chemisorb onto these types of compounds. Such chemisorption is highly disadvantageous, since it will result in the loss of the chemisorbed compound. Accordingly, low ash content carbon sorbents are particularly preferred in practice.

In the storage and dispensing system of the invention, the concentration on the sorbent material (based on the weight of the sorbent material) of trace components selected from the group consisting of water and oxidic transition metal species, desirably is insufficient to decompose more than 5%, and preferably more than 1% by weight of the sorbate fluid after 1 year at 25° C. and said interior pressure. Such constraint on the sorbent ensures that sorbate fluids such as hydride gases, e.g., arsine, phosphine, etc., which are otherwise susceptible to decomposition in the presence of water, metals, and oxidic transition metal species (e.g., oxides, sulfites and/or nitrates), are maintained free of substantial exposure to such species, so that significant levels of decomposition of the sorbate gas, and resulting pressure buildup problems, are avoided.

The problems incident to the use of high ash content carbon sorbents discussed hereinabove are particularly severe in the case of fluorides. The take-up of fluorides by high ash content carbon sorbents will actually result in interior pressure in the storage and dispensing vessel declining as the products of the reaction between the adsorbate and the impurities in the high ash sorbent yield involatile products.

Preferably, the concentration of trace components selected from the group consisting of water, metals, and oxidic transition metal species, based on the weight of the sorbent material, is insufficient to cause decomposition of the sorbate fluid resulting in more than a 25% rise, and preferably more than a 10% rise, in interior pressure after 1 week at 25° C. in the storage and dispensing vessel.

Sorbent materials advantageously employed in the practice of the present invention include carbon materials which desirably contain less than 350, preferably less than 100, more preferably less than 10, and most preferably less than 1 part(s)-per-million by weight of trace components selected from the group consisting of water and oxidic transition metal species, based on the weight of the sorbent medium.

Although the fluid storage and dispensing system of the invention is described hereinafter primarily with reference to dispensing of fluid from the vessel by pressure differential, it will be appreciated that the storage and dispensing system of the invention may effect dispensing solely by differential pressure desorption of the sorbate fluid, as well as thermally desorbing the fluid from the sorbent material on which it previously has been sorbed. Alternatively, the desorption of the sorbate fluid from the sorbent medium on which it is loaded, may be usefully carried out with a combination of pressure differential and thermally-mediated release of the sorbate from the sorbate medium.

The choice of the specific modality of desorption (pressure and/or thermal), and the appertaining process conditions therefor, may readily be selected and determined by the skilled artisan without undue experimentation, based on the nature of the sorbent material, the specific sorbate fluid, and the particular end use application in which the desorbed fluid is to be employed.

When the fluid storage and dispensing system of the invention is constructed and arranged to carry out thermal desorption of the fluid from the sorbent material in the vessel, heating means may be operatively arranged in relation to the storage and dispensing vessel for selective heating of the carbon sorbent material, to effect thermally-enhanced desorption of the sorbate gas from the sorbent material. The heating means may include electrical resistance heating elements, extended heat transfer surface members, radiative heating members, or other actuatable heating means disposed in the sorbent bed in the storage and dispensing vessel, or otherwise arranged for transfer or in situ generation of heat to the sorbent material, to effect elevation of the temperature of the sorbent, and desorption of the sorbate fluid.

The sorbent material employed in the practice of the invention may be suitably processed or treated to ensure that it is devoid of components or contaminants, e.g., trace components such as those discussed hereinabove, which would deleteriously affect the performance of the gas storage and dispensing system in respect of the sorption and desorption of the sorbate fluid. For example, the sorbent may be subjected to washing treatment(s), e.g., with hydrofluoric acid, or other appropriate reagent(s), to render it sufficiently free of trace components such as metals and oxidic transition metal species.

The sorbent material also may be variously treated to enhance the sorptive capacity and/or other performance characteristics of the sorbent. For example, the sorbent may be treated or reacted to functionalize the surface of the sorbent with chemical moieties which facilitate or enhance (1) sorption of a specific fluid on the sorbent medium when the sorbent is originally loaded with the fluid to be subsequently dispensed, and/or (2) desorption of the fluid when the sorbent is subjected to process conditions for dispensing the fluid from the storage and dispensing vessel.

Additionally, such treatment may improve the purity of the desorbate. For example, reductive treatment of the surface oxide groups may be used to reduce the amount of $CO$, $CO_2$ and hydrocarbon impurities in the desorbate.

Further, various temperature ranges may be used. During the degas procedure, carbon materials typically are degassed up to 500 degrees Centigrade, although higher temperature treatments may be applied.

Additional methods of modifying the sorbent material may be variously employed in the broad practice of the invention, including applying a sorption-enhancing material on the surfaces including the interior pore surfaces of the material. For example, an adsorption-enhancing liquid, solid, or semi-solid material, e.g., Carbowax, may be applied to the carbon sorbent, to facilitate physical sorption of the fluid on solid sorption sites on the surfaces of the carbon sorbent, as well as sorption on or solubilization in the adsorption-enhancing material itself which has been applied to the surfaces of the sorbent.

The storage and dispensing system of the invention additionally may comprise the sorbent material in the storage and dispensing vessel together with a chemisorbent material in the vessel having affinity for contaminants, e.g., decomposition products, of the sorbate fluid therein. Such chemisorbent may for example comprise a solid sorbent composition having a chemisorbent affinity for non-inert atmospheric gases. Examples of potentially suitable chemisorbent materials include scavengers selected from the group consisting of:

(A) scavengers including a support having associated therewith, but not covalently bonded thereto, a compound which in the presence of such contaminant provides an anion which is reactive to effect the removal of such contaminant, said compound being selected from one or more members of the group consisting of:
  (i) carbanion source compounds whose corresponding protonated carbanion compounds have a $pK_a$ value of from about 22 to about 36; and
  (ii) anion source compounds formed by reaction of said carbanion source compounds with the sorbate gas; and (B) scavengers comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

By way of further specific example, the chemisorbent material may advantageously comprise a scavenger component selected from the group consisting of: trityllithium and potassium arsenide.

In respect of the use of such chemisorbent materials for removing contaminants of the sorbate fluid to be dispensed, any of a wide variety of scavengers or chemisorbent materials may be employed, including scavenger compositions of the types disclosed and claimed in U.S. Pat. No. 4,761,395 issued Aug. 2, 1988 to Glenn M. Tom, et al., and U.S. patent application Ser. No. 08/084,414 filed Jun. 29, 1994, now U.S. Pat. No. 5,385,689, in the name of Glenn M. Tom and James V. McManus, the disclosures of which hereby are incorporated herein by reference.

The chemisorbent material when employed may be utilized as a separate bed in fluid flow communication with the bed of sorbent material, or alternatively the chemisorbent may be dispersed randomly or selectively throughout a bed of sorbent material in the storage and dispensing vessel.

The present invention also contemplates a process for supplying a fluid reagent, such process comprising:

providing a storage and dispensing vessel containing a sorbent material having a physically sorptive affinity for said fluid reagent;

physically sorptively loading the fluid reagent on the sorbent material, to yield a sorbate fluid-loaded sorbent material;

desorbing sorbate fluid from the sorbate fluid-loaded sorbent material, by reduced pressure (pressure differential) desorption and/or heating of the sorbent material; and dispensing the desorbed fluid from the storage and dispensing vessel.

In further preferred aspects, the sorbent material may be of any particular conformational type (e.g., beads, granules, pellets, powders, extrudates, etc.) and possess any of the sorbent characteristics variously described hereinabove.

Fluids which may be usefully stored and subsequently dispensed from the storage and dispensing system of the invention include any suitable fluid, e.g., a gas, vapor, liquid, multiphase fluid, and fluid mixtures, which has sorptive affinity for the specific sorbent material employed. Examples include acid and hydride gases, halide gases, organo compounds, vapor-phase organometallic compounds, oxidizing gases, etc.

Specific examples of sorbate gas species which are usefully storable and dispensable in the practice of the invention include silane, germane, arsine, phosphine, phosgene, diborane, germane, ammonia, stibine, hydrogen sulfide, hydrogen selenide, hydrogen telluride, nitrous oxide, hydrogen cyanide, ethylene oxide, the deuterated hydrides, halide (chlorine, bromine, fluorine, and iodine) compounds, including such compounds as $F_2$, $SiF_4$, $Cl_2$, $ClF_3$, $GeF_4$, $SiF_4$, boron halides, etc., and organometallic compounds of metals such as aluminum, barium, strontium, gallium, indium, tungsten, antimony, silver, gold, palladium, gadolinium, etc.

In another specific aspect, the invention relates to a storage and dispensing system of the general type described hereinabove, comprising boron trifluoride as the sorbent fluid, and wherein the boron trifluoride dispensed from the storage and dispensing system is contacted with a hydrogenation agent for converting the boron trifluoride gas to diborane. The hydrogenation agent may comprise any suitable hydrogenating reactant useful to effect such conversion, e.g., magnesium hydride.

The storage and dispensing system of the invention may be employed in any of a wide variety of end use applications, including ion implantation, silicon semiconductor manufacturing, compound semiconductor manufacturing, manufacture of flat panel displays, supply of gas for organic synthesis, dispensing of sterilizing gases, e.g., ethylene oxide, fumigation and pest control, anaesthesia gas delivery, treatment of water and other fluids involving gas-liquid contacting, welding, dispensing of gardening and crop protection formulations, cooking gas supply, space-borne applications, bulk chemical and gas delivery, oxygen supply for breathing gas applications as well as $O_2$ reagent applications, etc.

Other aspects, features and embodiments of the invention will be more fully apparent from the ensuing disclosure and appended claims.

DETAILED DESCRIPTION OF THE INVENTION, AND PREFERRED EMBODIMENTS THEREOF

Figure 1:
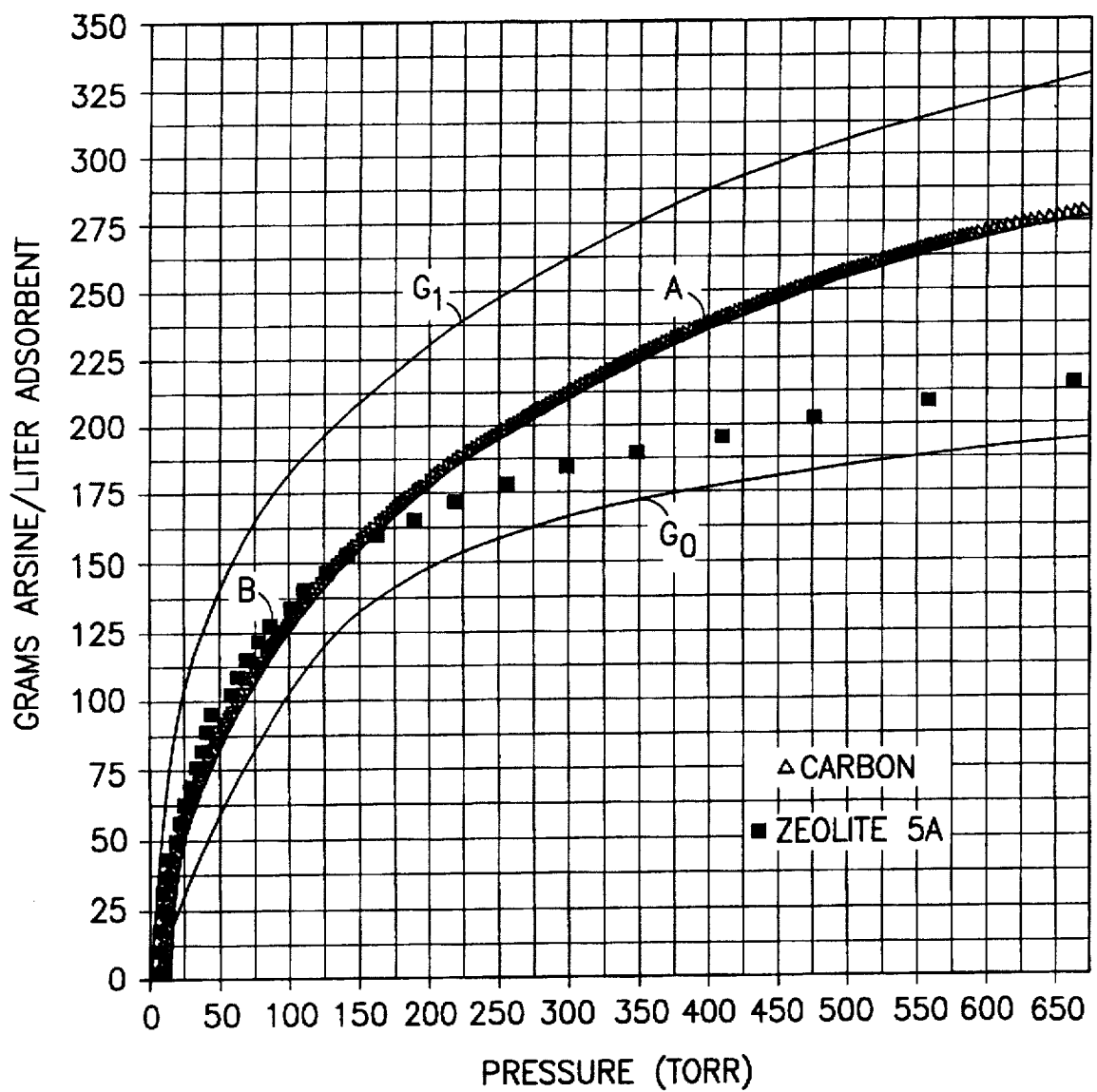
FIG. 1 shows a graph of the adsorption isotherm for arsine, as a plot of the arsine loading in grams arsine per liter of sorbent material, as a function of the pressure in Torr, for a carbon sorbent (curve A) and for zeolite 5A (curve B), together with isotherm bands $G_0$ and $G_1$, demarcating an isotherm regime for practice of the present invention in one aspect thereof.

The disclosure of International Patent Application No. PCT/US95/13040 filed Oct. 13, 1995 designating the United States as a Designated State and published Apr. 25, 1996, and the disclosure of U.S. patent application Ser. No. 08/322,224 filed Oct. 13, 1994, and issued May 21, 1996 as U.S. Pat. No. 5,518,528, are hereby incorporated herein by reference in their entirety.

The present invention provides a new low pressure storage and delivery system as a compact, portable, point-of-use source fluid supply means.

It will be recognized that the storage and dispensing system of the present invention may be operated at higher pressures than in the preferred (sub-atmospheric) low pressure regime, within the broad practice of the invention, however such storage and dispensing system has particular utility in applications in which the fluid is employed at sub-atmospheric pressure.

By such low pressure operation, the system of the invention obviates the necessity in many applications for high pressure fluid vessels of the prior art which heretofore have been used in such applications. Particularly where hazardous gases are involved, the use of high pressure vessels entails an enhanced risk of leakage and harm to persons and/or property, relative to the low pressure system of the present invention, where the fluid medium may be stored at near ambient pressure levels, and dispensed in a ready and controllable manner.

The fluid source system of the invention comprises a leak-tight vessel, such as a gas cylinder, containing the fluid to be dispensed, adsorbed into a sorbent material comprising a physical adsorbent material.

While the invention is discussed primarily hereinafter in terms of the storage and delivery of arsine gas, it will be recognized that the utility of the present invention is not thus limited, but rather extends to and is inclusive of a wide variety of other gases as well as liquids, liquid-vapor mixtures, etc. Illustrative examples include silane, diborane, arsine, phosphine, phosgene, chlorine, $BCl_3$, $BF_3$, $B_2D_6$, tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, deuterated hydrides, halide (chlorine, bromine, iodine, and fluorine) gaseous compounds such as $NF_3$, $ClF_3$, $GeF_4$, $SiF_4$, organo compounds, and organometallic Group V compounds such as $(CH_3)_3Sb$.

The novel means and method of the present invention for storing and delivering fluids at $\leq 0$ psig greatly reduces the hazard posed by these fluids. The inventive technique involves the adsorption of these fluids into a physical adsorbent. By adsorbing the fluid into a solid physical sorbent, the vapor pressure of the fluid can be reduced to $\leq 0$ psig. The release potential from this system is greatly reduced as the driving force of pressure is eliminated.

The sorbent employed in the broad practice of the present invention may be any suitable type having sorptive affinity for the fluid to be stored on and dispensed from the sorbent in the practice of the invention. The sorbent may, for example, comprise a porous silicon material, aluminum phosphate, clay, zeolite, polymers (including porous TEFLON, macroreticulate polymers and glassy domain polymers), aluminum phosphosilicate, carbon materials, etc.

Preferred sorbent materials in the practice of the invention include zeolites and carbon sorbents.

Preferred forms of carbon sorbent materials include: carbon formed by pyrolysis of synthetic hydrocarbon resins such as polyacrylonitrile, sulfonated polystryrene-divinylbenzene, etc.; cellulosic char; charcoal; activated carbon formed from natural source materials such as coconut shells, pitch, wood, petroleum, coal, etc.

A preferred carbon sorbent material is activated carbon, a highly sorbent form of carbon produced by heating granulated charcoal to appropriate elevated temperature. Most preferred are the so-called bead carbon forms of activated carbon, where the beads, i.e., highly uniform diameter spherical particles, may have a diameter in the range of from about 0.1 to about 1 centimeter, and more preferably from about 0.25 to about 2 millimeters diameter.

Commercially available carbon sorbent materials which are preferred in the broad practice of the invention include bead carbon materials designated as BAC-MP, BAC-LP, and BAC-G-70R, available from Kureha Corporation of America, New York, N.Y.; Ambersorb® carbonaceous sorbents commercially available from Rohm & Haas Company, Philadelphia, Pa. as grades Ambersorb® 563, Ambersorb® 564, Ambersorb® 348F, Ambersorb® 575, Ambersorb® 572, and Ambersorb® 1500; Calgon Filtrasorb 400® and BPL GAC carbon sorbent materials commercially available from Calgon Carbon Corporation; and bead activated carbon sorbent materials commercially available from Blucher GmbH, Erkrath, Germany. Among the aforementioned carbon sorbents, the Ambersorb® materials have substantial pore volume in pores greater than 50 Angstroms in diameter.

The sorbent used in the storage and dispensing system of the invention may have any suitable size, shape and conformation appropriate to the end use application and the specific sorbate fluid species involved. The sorbent material may for example be in the form of beads, granules, pellets, tablets, powders, particulates, extrudates, cloth or web form materials, honeycomb matrix monolith, composites (of the sorbent with other components), or comminuted or crushed forms of the foregoing conformations.

Collectively, the storage and delivery system of the present invention may usefully consist of a standard gas cylinder, and a cylinder valve or other flow dispensing assembly (regulators, monitors, sensors, flow directing means, pressure controllers, mass flow controllers, piping, valving, instrumentation, automatic start and shut-off devices, etc.) coupled to the cylinder, with the cylinder holding the sorbent material. After loading of sorbent into the storage and dispensing vessel, the cylinder is subsequently filled, e.g., to a pressure below 1 atmosphere pressure, with a sorbate fluid, to yield the product storage and dispensing system.

In use, fluid flow from the storage and delivery system of the invention by pressure differential desorption may be readily carried out by utilizing a pressure differential between the pressure in the interior volume of the storage and dispensing system and a lower pressure exterior to the sorbent-containing vessel.

For example, the sorbent-containing vessel may hold a reagent gas such as phosphine at a sub-atmospheric pressure, e.g., 600 Torr, for use in an ion implantation process, where the ion implant chamber for implanting the phosphorus constituent is maintained under vacuum conditions or alternatively at low pressure, e.g., less than 100 Torr, and below the pressure of the interior volume in the storage and dispensing vessel. As a result, phosphine gas will desorb from the carbon sorbent in the vessel and flow to the ion implant chamber, when gas flow communication is established between the ion implant chamber and the storage and dispensing vessel containing the sorbate phosphine gas. The storage and dispensing system thus effects flow of the phosphine gas through the connecting piping, valving and instrumentation, and is readily controllable at a desired flow rate. Utilizing a device such as a mass flow controller, a constant flow can be achieved as the sorbent vessel pressure decreases with continued dispensing operation.

Additionally, or alternatively, the fluid dispensing assembly of the storage and dispensing system of the invention may include means for heating the sorbent material, to thermally desorb sorbate fluid therefrom. Such heating means may include any suitable heat transfer or heat exchange devices, structures or apparatus, which are operatively associated with the sorbent material to effect heating thereof, for thermal desorption of the sorbate from the sorbent medium. Thus, the present invention contemplates heat- and/or pressure-mediated dispensing of sorbate fluid from the sorbent on which same is stored.

Referring now to the drawings, FIG. 1 is a graph of an adsorption isotherm for arsine, shown as a plot of the arsine loading, measured in grams of arsine per liter of sorbent material, as a function of the pressure, measured in Torr, for each of an illustrative carbon sorbent (curve A, data point symbol Δ) and for zeolite 5A molecular sieve (curve B, data point symbol ○). The carbon sorbent material is a Kureha BAC-G-70R carbon material, having the following physical properties set out in Table I below.

TABLE I

| Bead Carbon Sorbent Material | |
|---|---|
| True Density | 1.9–2.1 g/ml |
| Bulk Density | 0.5–0.62 g/ml |
| Surface Area | 800–1300 m²/grams |
| CCl4 Activity | >=55% |
| Kindling Point | 400° C. |
| Auto-ignition Point (in air) | 400° C. |
| Ash Content | <=0.5% |
| Particle Size Availability | 0.4–0.7 mm |
| Particle Size of BAC-G-70R | 0.7 mm Avg.; >.84 mm (25%); <.59 mm (5%) |
| Moisture Content | <5% |

Note in respect of the foregoing that the moisture content of this bead carbon material is further reduced by heating and evacuation of the carbon as originally supplied from the vendor, to levels as low as 0.01% and below. Such pretreatment of the carbon sorbent is also of benefit in respect of other undesirable adsorbed impurities in the as-received carbon material.

Figure 2:
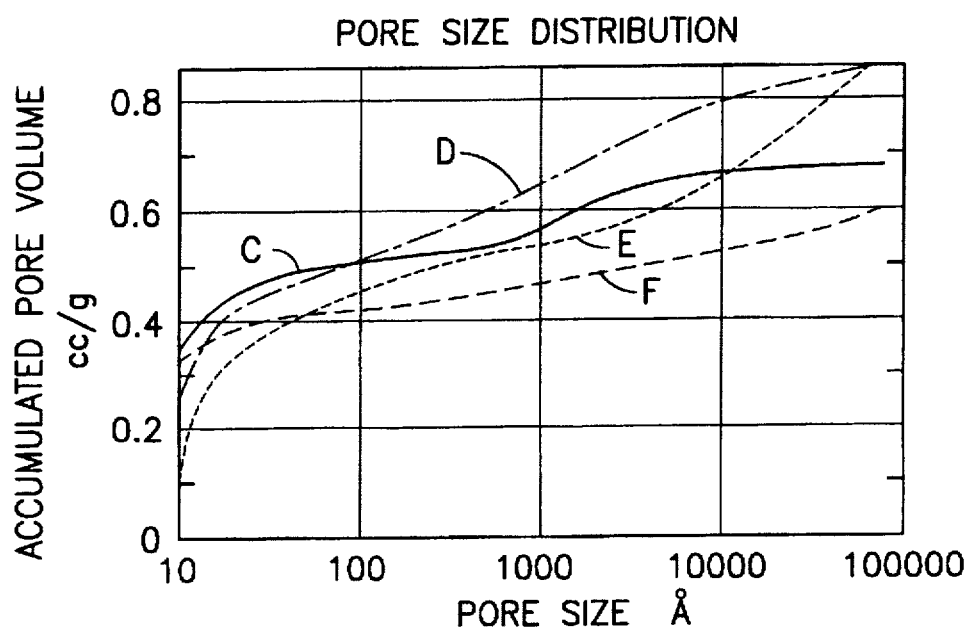
FIG. 2 is a plot of accumulated pore volume, in cubic centimeters per gram, as a function of pore size, for some illustrative activated carbon sorbents useful in the broad practice of the present invention.

FIG. 2 is a plot of accumulated pore volume, in cubic centimeters per gram, as a function of pore size, in Angstroms, for the bead carbon sorbent material of Table I (curve C) and for some additional illustrative commercially available activated carbon sorbents (curves D, E and F) useful in the broad practice of the present invention. As shown, the curve C bead carbon material has an accumulated pore volume of from about 0.3 to about 0.7 over the range of pore sizes from 10 to 10,000 Angstroms. The other carbon sorbent materials of curves D, E and F have a wider range of accumulated pore volume.

In general, it is desirable to utilize a sorbent material having a substantial portion, preferably at least 50%, of its pores in the size range of from about 10 to 1000 Angstroms. More desirably, the sorbent material has a major fraction, i.e. more than 50%, of its pore volume, comprised of pores with a diameter in the range of from about 2 Angstroms to 100 Angstroms, with preferably more than 80%, and most preferably substantially all of the pore volume of the sorbent material, being in such range.

Preferred sorbent materials include sorbents having an average pore diameter in the range of from about 10 to about 20 Angstroms, and a major fraction of the pore volume within such range, with preferably more than 80%, and most preferably substantially all of its pore volume being in such range.

Desirable sorbents include materials having a pore volume (cumulative void volume) in the range of from about 0.2 to about 2.0 cubic centimeters of pore volume per gram of sorbent material.

The interior pressure in the sorbent-containing vessel of the low pressure storage and dispensing system of the invention is below about 1200 Torr. Preferably, the pressure is below 800 Torr, and most preferably below 700 Torr. By providing a sub-atmospheric pressure of the sorbed fluid in the storage and dispensing vessel, the risk of leaks and bulk dispersion of the sorbate fluid to the ambient environment is obviated, in contrast to the prior art practice where high pressure containment of the fluid entails a constant and significant risk, and corresponding safety and handling issues.

In another specific aspect, the present invention relates to a fluid storage and dispensing system of the type broadly described hereinabove, comprising a high Sorbent Loading Capacity, high Percent Desorbable Sorbate, and high Sorbent Working Capacity The Percent Desorbable Sorbate desirably is on the order of at least 15%, preferably at least 25%, more preferably at least 50%, and most preferably at least 60%.

The sorbent material desirably has the characteristic of readily sorbing the sorbate fluid in the first instance, at suitably high rate, and correspondingly releasing the previously sorbed fluid in a rapid manner in response to (1) a pressure differential between the interior volume of the storage and dispensing vessel and an exterior locus at lower pressure, and/or (2) heating of the sorbent, when the storage and dispensing system is in a fluid dispensing mode of operation.

Preferred sorbent materials useful in the fluid storage and dispensing system of the invention include materials having a pore volume (cumulative void volume) in the range of from about 0.1 to about 5.0 cubic centimeters of pore volume per gram of sorbent material, and preferably from about 0.5 to about 2.0 cubic centimeters of pore volume per gram of sorbent material.

Highly preferred materials include sorbents having an average pore diameter in the range of from about 2 to about 20 Angstroms, and a major fraction of the pore volume within such range, more preferably more than 80%, and most preferably substantially all of its pore volume being in such range.

High performance sorbents useful in the broad practice of the present invention include those having a Sorbent Working Capacity, $C_w$, measured for arsine gas at 40 Torr and at 650 Torr, of at least 50, preferably at least 100, more preferably at least 150, and most preferably at least 200, grams arsine per liter of sorbent material.

Bead activated carbon materials, having a highly uniform spherical shape, with a particle size in the range of from about 0.1 millimeter to 1 centimeter diameter, and more preferably from about 0.25 to about 2 millimeters diameter, are highly advantageous in the practice of the present invention. It will be recognized that the sorbent particle size, shape, and pore size distribution may be independently and significantly varied in the practice of the invention, to adjust the packing of the sorbent particles and the loading density of the sorbent material in the bed.

The sorbent materials useful in the fluid storage and dispensing system of the invention generally may have any suitable size, shape, and conformation, including beads, granules, pellets, tablets, powders, particulates, extrudates, cloth or web form materials, honeycomb matrix monolith, and composites (of the sorbent with other components), as well as comminuted or crushed forms of the foregoing conformations of sorbent materials.

The sorbent material may comprise any suitable material, including polymers (e.g., microporous TEFLON, macroreticulate polymers, glassy domain polymers, etc.), aluminum phosphite, clays, zeolites, porous silicon, honeycomb matrix materials, carbon materials, etc.

Most preferred sorbent materials include zeolite sorbent materials and carbon sorbents. Among the preferred carbon sorbent materials, bead activated carbon materials, having a highly uniform spherical shape, with a particle size in the range of from about 0.1 millimeter to 1 centimeter diameter, and more desirably from about 0.25 to about 2 millimeters diameter, are most highly preferred.

Again using arsine as the reference gas for the characterization, particularly useful sorbent materials in the fluid storage and dispensing system of the invention comprise materials which have an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) of at least: |
| --- | --- |
| 25 | 30 |
| 50 | 62 |
| 100 | 105 |
| 200 | 145 |
| 300 | 168 |
| 400 | 177 |
| 500 | 185 |
| 550 | 188 |
| 650 | 192 |

Although it generally is desirable that the sorbent materials employed in the storage and dispensing system of the invention have as high a loading characteristic as possible for the sorbent fluid which is to be stored thereon and subsequently dispensed from the sorbent, extremely high sorbent loading capacity may in some instances be disadvantageous from a heat of sorption standpoint, in respect of the manufacture of the storage and dispensing system. The sorption of the sorbable fluid on the sorbent is typically exothermic and for gases such as arsine and phosphine, the exotherm, depending on the fill rate of the gas onto the sorbent, may entail temperature rises on the order of 100° C. or more. Accordingly, it may be desirable to utilize a sorbent medium having high sorptive capacity within a range which does not entail a large heat of adsorption effect during the initial loading of the sorbent medium with the fluid to be stored thereon for subsequent dispensing.

Accordingly, sorbent materials useful in the practice of the invention may include materials having an adsorption isotherm for arsine gas, at 25° C., measured as grams of arsine adsorbed per liter of the sorbent, as a function of pressure in Torr, which is within the adsorption isotherm range bounded by curves $G_1$ and $G_0$ in FIG. 1. Such sorbent materials have the following sorbent loading characteristics.

| Pressure, Torr | Loading (grams of arsine per liter of sorbent): |
| --- | --- |
| 25 | 30–106 |
| 50 | 62–138 |
| 100 | 105–185 |
| 200 | 145–232 |
| 300 | 168–263 |
| 400 | 177–288 |
| 500 | 185–308 |
| 550 | 188–315 |
| 650 | 192–330 |

It will be recognized that the pore size, pore volume, and surface area characteristics of the sorbent may be widely varied in the broad practice of the present invention, and that the skilled artisan may readily determine suitable sorbent characteristics for a given end use application of the storage and dispensing system of the present invention without undue experimentation using surface area and porosity determinations, e.g., with mercury porosimetry techniques, and affinity studies for the particular fluid sought to be stored on and dispensed from the particular candidate sorbent material.

Referring again to FIG. 1, an isotherm for a sorbent material and a specific sorbate gas is generally useful in predicting the quantity of sorbate removable at a given pressure. This is due to the reversibility of the adsorption/desorption process for the physisorbed fluid species. For example, for the bead carbon sorbent material of curve A, if the sorbent material on which the arsine fluid is sorbed, is desorbed from a pressure of 650 Torr to a pressure of 100 Torr, then the isotherm predicts that 140 grams of arsine per liter of sorbent material (275 grams–135 grams=140 grams) should be desorbed. The zeolite 5A molecular sieve, by contrast, when desorbed over a same pressure differential, exhibits desorption of only 87.5 grams of sorbate fluid (215 grams–127.5 grams=87.5 grams).

Thus, the amount of sorbate recoverable from the carbon sorbent in a storage and dispensing system of the invention, when operated by pressure desorption over the specified pressure range of 650 Torr to 100 Torr, is 60% higher than the zeolite 5A material of the prior art storage and dispensing system.

Figure 3:
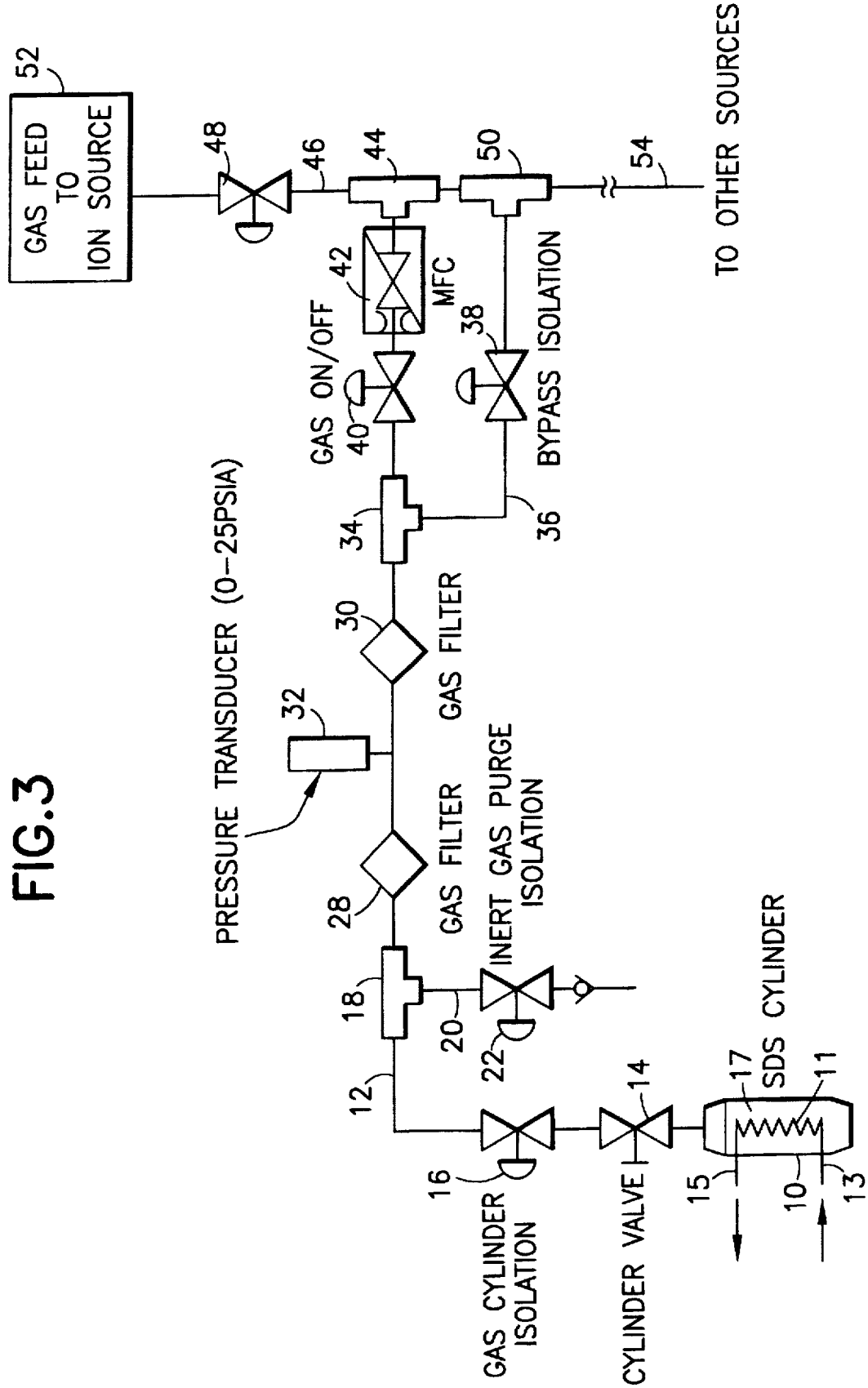
FIG. 3 is a schematic representation of a storage and delivery system according to one embodiment of the invention.

FIG. 3 is a schematic representation of a storage and delivery system according to one embodiment of the invention.

In the schematic storage and delivery system shown in FIG. 3, a gas storage cylinder 10 is provided which may be filled with a bed 17 of suitable physical adsorbent material, e.g., a bead activated carbon physical adsorbent medium of a type as more fully described hereinabove. The gas cylinder 10 contains the bed 17 of sorbent material, with the sorbent material having physically adsorbed gas component(s), such as arsine or phosphine, adsorbed on its surfaces (including pores as well as exterior surface of the sorbent media).

The cylinder 10 is connected to a manifold 12, having disposed therein a cylinder valve 14 for controllably releasing gas from cylinder 10, upstream of a gas cylinder isolation valve 16, which may be selectively actuated to close cylinder 10 to communication with the manifold 12.

The manifold has a branch fitting 18 therein, by means of which the manifold 12 is coupled in gas flow communication with a branch purge line 20 having inert gas purge isolation valve 22 therein, whereby the manifold may be purged with inert gas, prior to active operation delivery of gas from cylinder 10.

Downstream from the fitting 18, the manifold contains two successive gas filters 28 and 30, intermediate of which is disposed a pressure transducer 32 which may, for example, have a pressure operating range of from about 0 to about 25 psia.

The manifold 12 is connected downstream of gas filter 30 with a branch fitting 34 to which is coupled a bypass conduit 36 having bypass isolation valve 38 therein. The manifold 12 downstream of fitting 34 has a gas flow on-off valve 40 therein, downstream of which is disposed a mass flow controller 42 for controllably adjusting the flow rate of the gas dispensed through manifold 12. At its terminus downstream of mass flow controller 42, the manifold 12 is connected by coupling fitting 44 to dispensing line 46 having flow control valve 48 therein, and also being coupled in gas flow communication with bypass line 36 via coupling fitting 50. The discharge line 46 is as shown joined to an ion source generating means, schematically shown as element 52. The other end 54 of discharge line 46 may be suitably coupled in gas flow communication with another gas dispensing means, as desirable or necessary in a given end use application of the FIG. 3 storage and delivery system apparatus.

Shown as an optional feature of the storage and dispensing vessel 10 in the FIG. 3 embodiment is a heat exchange passage 11 which extends vertically upwardly through the bed 17 of sorbent material. The heat exchange passage is joined at its respective lower and upper ends to heat exchange fluid feed inlet line 13 and heat exchange fluid effluent discharge line 15. The heat exchange fluid feed inlet line 13 may in turn be joined to a suitable source of heat exchange fluid (not shown) which may be operatively associated with a burner, resistance heater, or other heating means serving to selectively heat the bed 17 of sorbent material when it is desired to dispense fluid from the vessel 10. Thermal desorption thus may be effected by passage of a suitable heat exchange fluid through the feed inlet line 13, the heat exchange passage 11, and the fluid effluent discharge line 15, for recirculation (e.g., by pump and reservoir means, not shown) through the heat exchange circuit. Such heating means thereby function to heat the sorbent medium in the bed 17 to sufficient elevated temperature for thermally-assisted desorption to take place.

By the arrangement schematically shown in FIG. 3, thermally assisted desorption and dispensing of the sorbate fluid may be carried out alternative to, or in combination with, pressure differential-mediated dispensing of the sorbate fluid, with the choice of the specific desorption modality being readily selected and/or determinable without undue experimentation by those skilled in the art.

In the manufacture of the storage and dispensing system of the invention, the storage and dispensing vessel is cleaned, if required, to ensure the absence of any contaminants or species therein, including out-gassable species in the walls of the vessel, which may adversely impact the storage and dispensing operation subsequently carried out with the vessel. For this purpose, it may be desirable to bake out, solvent degrease, or otherwise subject the vessel and its interior surfaces to cleaning, removal or treatment steps, to provide an appropriately clean container for the subsequently installed sorbent material.

The sorbent material then is loaded into the interior volume of the storage and dispensing vessel, and the vessel is final assembled and sealed. The sorbent material may be cleaned or processed prior to its introduction to the vessel, so that the sorptive capacity of the sorbent medium is maximized. Additionally, or alternatively, the sorbent medium may be cleaned or processed in situ, to ensure maximum sorptive capacity, e.g., by bake-out of the vessel containing the sorbent, at sufficient elevated temperature and for sufficient time to desorb and clean the sorbent material of extraneous sorbate species. For example, the vessel may be evacuated (degassed) for an extended period of time, e.g., 48 hours, at a suitable elevated temperature, e.g., 200°–400° C., using an appropriate vacuum pump or other evacuation means. After evacuation, the vessel is allowed to cool to room temperature over a suitable period of time, e.g., ~6–12 hours.

After the evacuation/degas procedure, the evacuated sorbent container is connected to a sorbate fluid fill manifold. It will be recognized that the sorption of fluid species may involve significant exotherm due to heat of adsorption effects, and therefore it is desirable to maintain the vessel and carbon sorbent material at suitable temperature so that the sorbate fluid is not desorbed by such heat effects after its initial take-up by the sorbent material.

In order to maintain an approximate isothermal condition, the cylinder may for example be immersed in a thermal ballast liquid, such as for example an aqueous ethylene glycol mixture maintained at a constant temperature of 25° C.

The sorbate fluid fill manifold may be evacuated prior to sorbate fluid dispensing to appropriately low pressure, e.g., to less than $10^{-3}$ Torr, to remove non-condensable gases that may be present in the flow passages of the fill manifold. After such evacuation, the sorbent-containing vessel may be filled with the sorbate fluid at a suitable rate until the desired pressure level is reached. For purposes of efficiency, it may be desirable to monitor the pressure of the vessel during the fill operation with a suitable pressure monitor or other (e.g., transducer-based) sensing means.

During the filling process, the temperature of the vessel and the thermal ballast tank may be independently monitored, along with the sorbate fluid temperature, for process control purposes. Pressure is monitored to determine the endpoint of the fill process.

It may be desirable to fill the vessel with the sorbate fluid in stages, and to allow equilibration of the system so that the temperature effects are at least partially dissipated to the ambient environment or to a heat transfer medium such as the thermal ballast liquid described hereinabove.

Alternatively, it may be suitable to fill the vessel to a specified pressure, and then allow the vessel to cool to a final temperature and pressure condition of the sorbent bed and associated vessel.

Thus, dose filling or continuous filling of the sorbate fluid may be carried out, to introduce the sorbate fluid into the vessel for sorptive take-up by the sorbent material therein. Following the fill sequence, the vessel, after its disengagement from the fill manifold, may be shipped, stored, or arranged for subsequent dispensing use by attachment to piping, coupling, and dispensing circuitry at the dispensing site.

Figure 4:
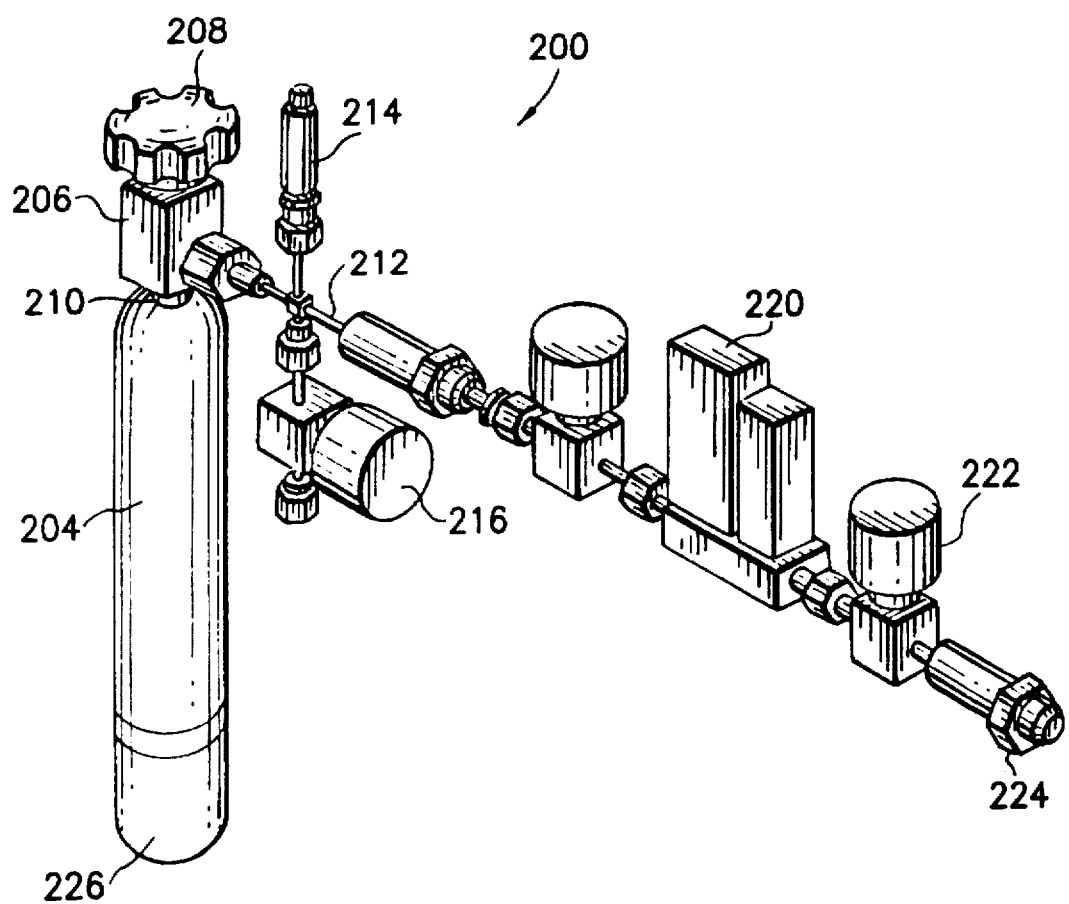
FIG. 4 is a perspective schematic representation of a storage and dispensing system according to another embodiment of the invention.

FIG. 4 is a perspective schematic view of a storage and dispensing system 200 according to another embodiment of the invention.

As shown, the storage and dispensing system 200 comprises a storage and dispensing vessel 204 having a base portion 226 and which is joined at its upper portion to a valve head 206 comprising part of a dispensing assembly including manual actuator 208 for the valve head on the cylinder. The valve head is joined by means of coupling 210 to a dispensing conduit 212 having disposed therein a pressure transducer 214, an inert purge unit 216 for purging the dispensing assembly with inert gas, a mass flow controller 220 for maintaining constant flow rate through the dispensing conduit 212 during the dispensing operation, and a filter 222 for removing particulates from the dispensed gas prior to its discharge from the dispensing assembly.

The dispensing assembly further comprises a coupling 224, for mateably engaging the dispensing assembly with downstream piping, valving, or other structure associated with the locus of use of the desorbed fluid.

Figure 5:
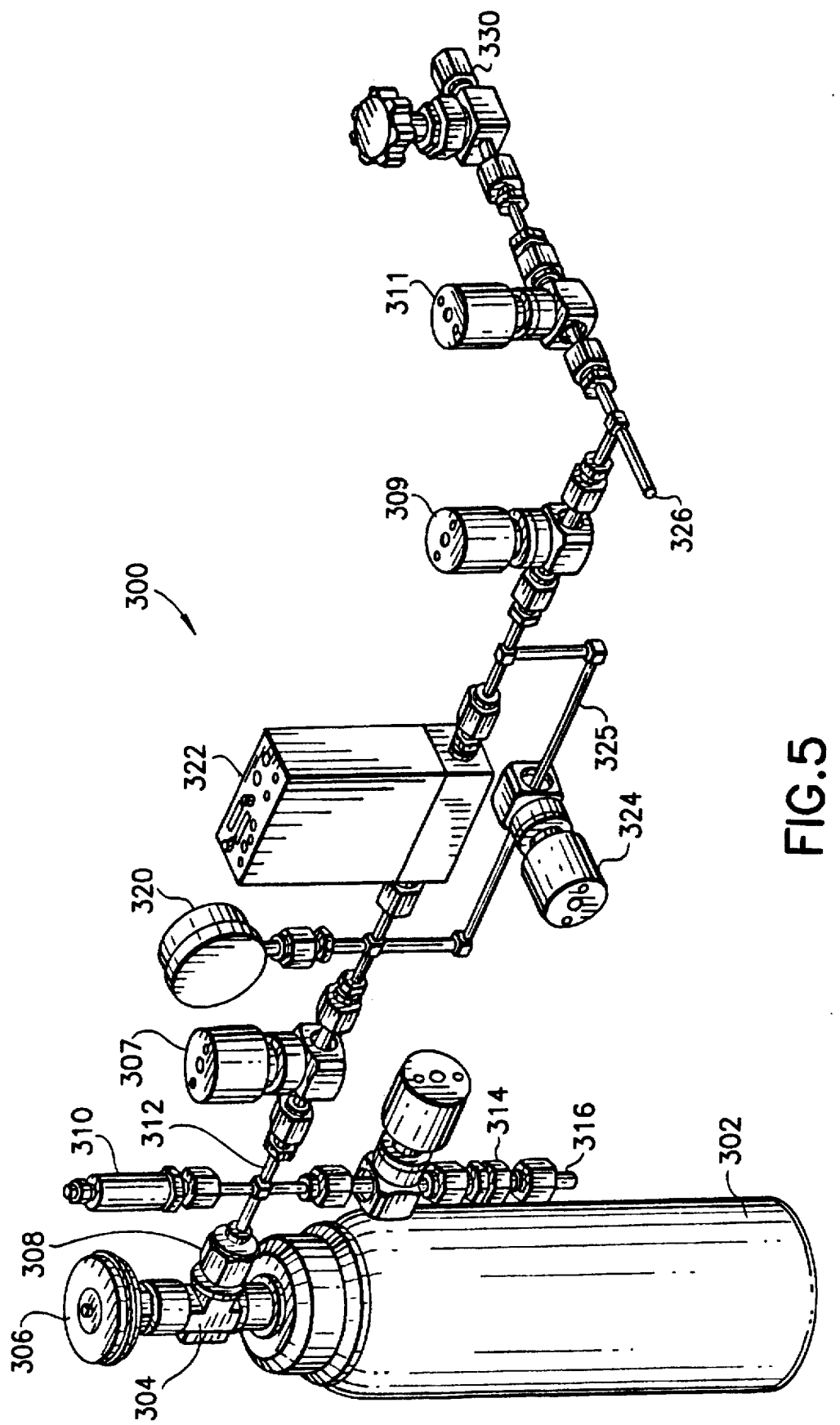
FIG. 5 is a perspective schematic representation of an apparatus including a gas storage and dispensing system according to another embodiment of the invention, for ion implantation.

FIG. 5 is a process system 300 including a storage and dispensing arrangement for delivery of gas, in accordance with one embodiment of the invention, for ion implantation use of the dispensed gas.

As shown, the apparatus includes a storage and dispensing vessel 302 having joined to its upper end a valve head 304 coupled with a manual valve actuator wheel 306. The valve head is coupled to a VCR filter gasket 308, which in turn is coupled with flow conduit 312. Flow conduit 312 communicates with the pressure transducer 310, as well as the check valve 314 and nitrogen purge inlet 316. The nitrogen purge inlet is employed for introduction of nitrogen or other purge gas for clearance of the dispensing assembly flow passages, for subsequent dispensing of gas from vessel 302.

Flow conduit 312 has further disposed therein a flow control valve 307, a span gauge 320, a flow controller 322 and flow control valve 309. The flow conduit 312 also is coupled in flow circuit-forming relationship to the bypass conduit 325 having by-pass valve 324 therein. The flow conduit 312 is joined at its right hand end as shown, to gas box manifold conduit 326. Conduit 326 has valve 311 positioned therein, and has a coupling 330 opposite the end communicating with the gas box manifold, for coupling of the storage and dispensing system with the ion implantation chamber.

In operation, gas from the sorbent bed (not shown) in storage and dispensing vessel 302 is flowed in flow conduit 312 and gas box manifold conduit 326 to the ion implantation chamber, at a controllable rate, as controlled by flow controller 322. The pressure transducer 310 may be operatively coupled in relationship to flow controller 322, as well as other elements, e.g., valves, in the flow circuit, to carry out the dispensing of the gas for ion implantation, in a suitable manner.

Figure 6:
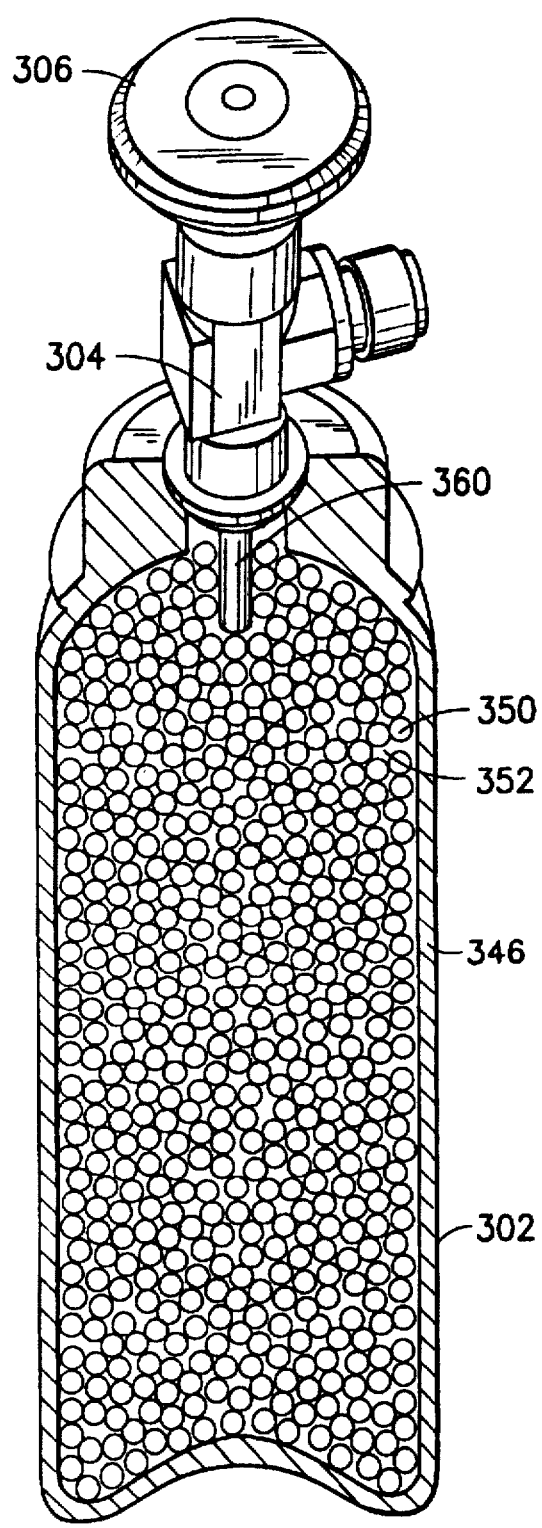
FIG. 6 is a perspective sectional view of the gas storage and dispensing vessel of the FIG. 5 system, showing the interior structure thereof.

FIG. 6 is a perspective cross-sectional view of the storage and dispensing vessel 302 of FIG. 5, showing the interior structure of such vessel.

As shown, the vessel 302 comprises a wall 346 enclosing an interior volume 352 of the vessel, and containing a particulate sorbent material 350 therein. At the upper end of the vessel, at the port to which the valve head 304 is joined, the port may feature porous centered tube 360, or other foraminous or otherwise gas-permeable structure serving to prevent entrainment in the dispensed gas of particulate solids from the bed of the sorbent material.

Figure 7:
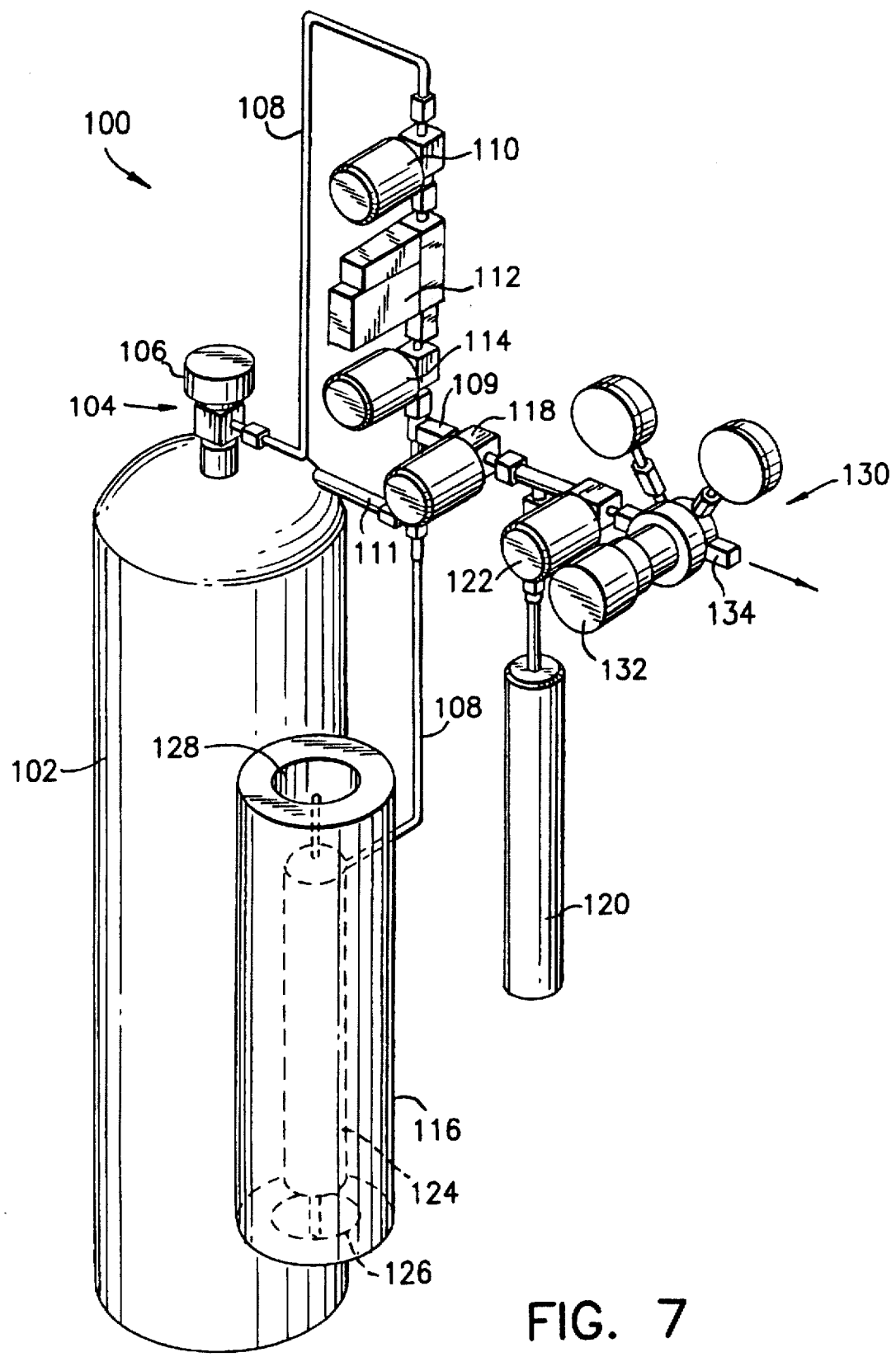
FIG. 7 is a schematic perspective view of a cryopumping storage and delivery system apparatus according to a further embodiment of the invention.

FIG. 7 is a schematic perspective view of a cryopumping storage and delivery system apparatus according to a further embodiment of the invention.

Although the fluid storage and dispensing system of the present invention has been described hereinabove with reference to low pressure dispensing applications such as ion implantation, where the locus of use of the desorbed sorbate gas is at vacuum or very low pressure levels, it will be appreciated that the utility of the invention is not thus limited, but also encompasses applications in which the storage and dispensing vessel must furnish sorbate gas to a downstream use point at higher-than-atmospheric pressure.

For applications in which it is desired to provide gases for use at a higher-than-discharge pressure from the sorbent-containing vessel of the storage and delivery system, various pressure building circuits, pressurizing equipment, or other means or methods may advantageously be employed.

For example, venturi pumps may be provided to raise the pressure of the supplied gas to a selected pressure level above that at the cylinder head (of the cylinder containing the sorbent binding the gas being dispensed). Although such venturi pumping arrangements yield the dispensed gas at the selected higher pressure level, such arrangements nonetheless entail dilution of the gas being dispensed with a carrier gas, since the carrier gas is entrained with the dispensed gas from the cylinder.

Such carrier gas dilution effects may be satisfactory in some applications, however in some uses, these dilution effects may represent a significant constraint on the overall process system, e.g., in instances where neat gas of high purity is desired to be supplied from the storage and delivery system. Mechanical pumps may be used in place of venturi pumping means, but mechanical pumps entail the disadvantage of a significant number of moving parts, which can cause problems associated with the formation of particulates in the pump and/or entrainment of lubricants in the gas stream. Again, these may be tolerable concomitant effects in some applications, but in other uses, the supplied gas must be maintained at high purity and free of particulates or other extraneous material.

In instances where the gas supplied by the storage and delivery system must be furnished at high pressure in a high purity, neat condition, the provision of a cryopumping assembly in the storage and delivery system may be advantageous.

FIG. 7 is a schematic perspective view of such a cryopumping storage and delivery system apparatus 100, according to a further embodiment of the invention.

In the cryopumping system, the main cylinder 102 contains a suitable carbon sorbent material (not shown), having loaded thereon a suitable sorbate gas species to be subsequently dispensed. Cylinder 102 is equipped with a valve head assembly 104 including main cylinder valve 106, which is in the "off" position at the start of the dispensing process.

The valve head 104 is coupled to conduit 108 containing isolation valve 110, mass flow controller 112, isolation valve 114, and cryopump 116. Conduit 108 is in turn coupled to conduit 109 containing isolation valves 118 and 122 and product dispensing regulator assembly 130 having discharge port 134 coupleable to a downstream process system. Joined to the conduit 109 is a medium pressure storage vessel 120.

The cryopump 116 coupled to conduit 108 is provided with a liquid nitrogen (or other suitable cryogenic liquid or fluid) inlet 128 and a liquid nitrogen outlet 126, with a liquid cryogen flow path being provided intermediate the inlet 128 and the outlet 126 which is circumscribed by heating elements 124 as shown. The liquid cryogen inlet and outlet of the cryopump may be suitably joined to a source of liquid cryogen, as for example a cryogenic air separation installation or a cryogenic cylinder source of liquid nitrogen or other coolant. The cryopump thereby forms a cryotrap apparatus. The outlet of the cryopump thus is provided with an isolation valve 118, and the medium pressure cylinder 120 is isolatable by means of the isolation valve 122.

A pressure transducer 111 is provided in conduit 108 and is coupled in pressure monitoring relationship to cylinder 102 for monitoring of pressure in the cylinder and responsively adjusting the isolation valve 118.

The operation of the storage and delivery system shown schematically in FIG. 7 is illustrated below with reference to silane as the gas sorbed on the carbon sorbent in cylinder 102 and to be delivered at suitable elevated pressure, and nitrogen as the cryogen to be employed as the working fluid in the cryopump 116. Silane has a boiling point of −111.5 degrees Centigrade and a melting point of 185 degrees Centigrade, and nitrogen has a boiling point of −195.8 degrees Centigrade.

Silane has been selected for illustration purposes since it is relatively difficult to deliver at suitably elevated pressure (in relation to other hydridic gases such as arsine which have higher boiling and freezing points, and thus may be more easily cryopumped with less cryogenic cooling being required).

If at the outset valves 110, 114, and 106 are open, with valves 118 and 122 being closed and under vacuum, and the temperature in the cryogenic pump is lowered to liquid nitrogen temperatures, silane will condense and freeze in the cryopump, even if relatively low internal pressures exist in the supply cylinder 102.

The mass flow controller 112 allows for accurate determination of the quantity of gas being transferred to the cryopump 116. Such accurate determination is important because overpressurization of the cryopump is desirably avoided. Under such operating conditions, silane will be above its critical temperature so that the ultimate pressure in the cryopump can potentially become very high.

After the correct amount of gas has been transferred to the cryopump 116, the valves 110 and 114 are closed. The condensed silane then is warmed to near ambient temperatures. The heating is carried out by the heating means 124, which in the embodiment shown comprise band heaters but could be any suitable heating means appropriate for such service. The silane gas does not thereby have to be heated to high temperatures, and the stability and purity of the product gas to be dispensed is thereby enhanced, since heating may result in the occurrence of degradation of the silane gas with consequent adverse effect on its purity and further stability.

The pressure of the silane gas after the warm-up in the cryopump may become significantly elevated, and effectively the gas thereby has become compressed, in a high purity state, and without exposure to a mechanical pump with many moving parts, the use of which may otherwise result in contamination of the product gas.

The inventory of gases in the overall system may be quite low at this point, with most of the silane residing in the sorbent vessel, cylinder 102, at low pressure.

Opening valve 118 will then allow gas to flow into the medium pressure cylinder 120; if valve 122 is open, then product silane gas can flow to the downstream process through discharge port 134, as monitored by the monitoring means (e.g., flow pressure) associated with the regulator assembly 130. The regulator assembly 130 has associated pressure transducer 132 which may be operatively coupled in the overall system with the other valves and cryopump components so that the product gas is delivered at a selected pressure and volumetric flow rate.

Correspondingly, the various valves, mass flow controller, cryopump, transducers and regulator may be operatively interconnected in any suitable manner, e.g., with cycle timer, and process safety systems, to carry out the demand-based delivery of silane or other sorbate gases, in a readily controllable and reproducible manner.

Accordingly, the operation of the system schematically shown in FIG. 7 desirably is timed to avoid disruption to or interference with downstream process flows. Signals from the mass flow controller and pressure transducers in the cryopump and medium pressure tanks can be used in an automated process system. The cryopump can be cycled to move gases from the storage and delivery system to the medium pressure cylinder 120 to maintain a constant pressure at the outlet of the regulator.

Figure 8:
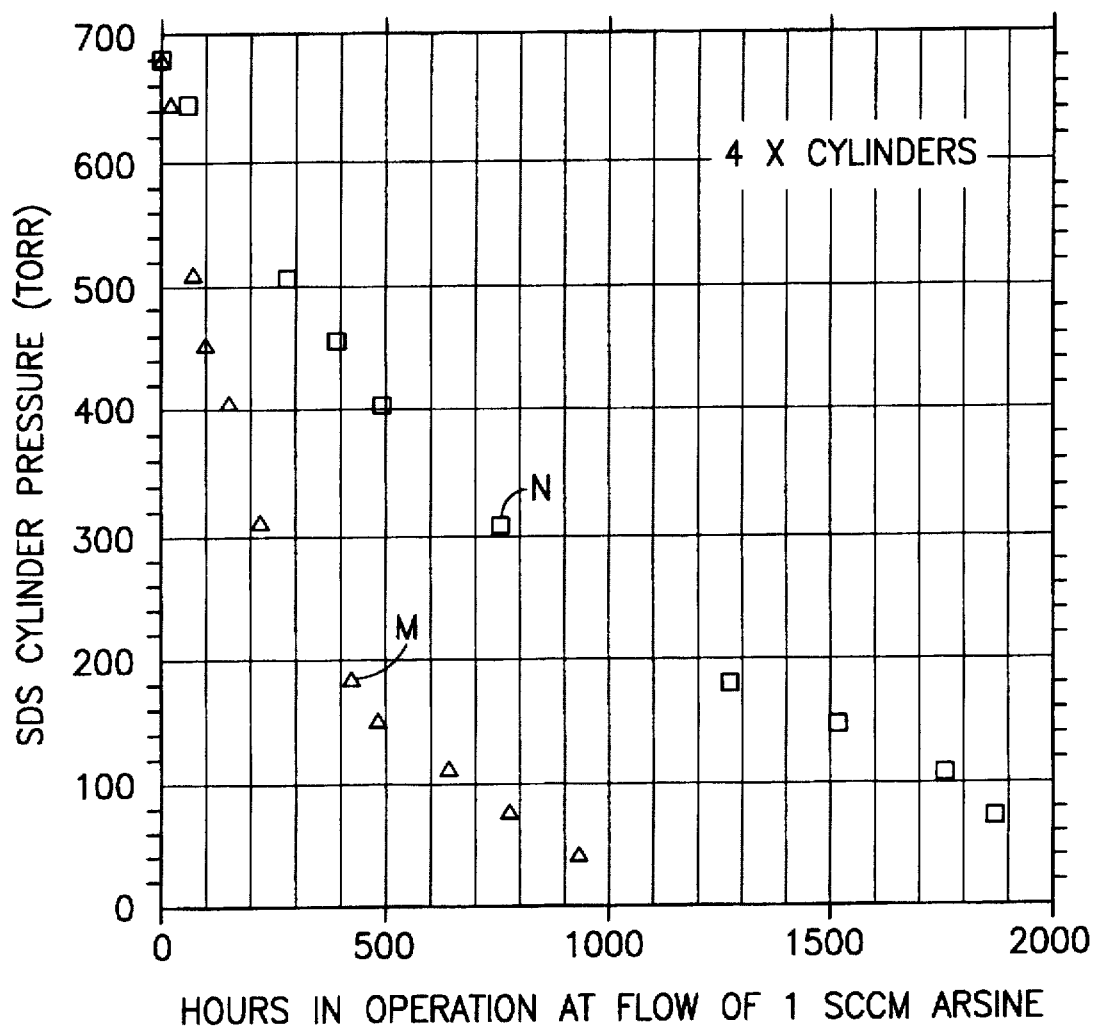
FIG. 8 is a graph of performance of a storage and delivery system comprising 5A molecular sieve as the sorbent material (curve M) and a storage and dispensing system comprising bead activated carbon as the sorbent material (curve N), showing pressure in the storage and dispensing vessel, in Torr, as a function of hours in operation at a flow rate of 1 standard cubic centimeter arsine per minute.

FIG. 8 is a graph of performance of a storage and delivery system comprising 5A molecular sieve as the sorbent material (curve M, data point symbol △) and a storage and dispensing system comprising bead activated carbon as the sorbent material (curve N, data point symbol □), showing pressure in the storage and dispensing vessel, in Torr, as a function of hours in operation at a flow rate of 1 standard cubic centimeter arsine per minute. These curves show that at a constant flow rate of 1 sccm dispensing of arsine, a storage and dispensing system comprising bead activated carbon (curve N) provides an improvement in dispensing service life approaching 2000 hours and that the storage and dispensing system of curve M has a dispensing service life approaching 1000 hours.

The storage and delivery system apparatus and method of the invention provide a significantly safer alternative to the current use of high pressure gas cylinders for the storage and dispensing of sorbable gases. The invention provides the capability to transport, store and deliver sorbable fluids from a cylinder or other vessel at zero psig With only low level heating of the sorbent material in the practice of the present invention, by so-called thermally assisted delivery, it is possible to augment the delivery rate of the desorbing gas, so that flow rates of up to 500 sccm and higher am readily achievable. Nonetheless, high rates of gas delivery are achieved in the broad practice of the present invention with adiabatic operation (no supplemental input of heat or thermal energy to the sorbate-laden sorbent medium), solely by the pressure differential existing between the sorbent vessel and the reduced pressure of the external dispensing locus, e.g., in a semiconductor or other industrial or manufacturing process facility, such as an ion implantation chamber, molecular beam epitaxy unit, or chemical vapor deposition reactor.

The apparatus of the present invention may be readily provided in a unitary apparatus form, as for example by disposing one or more storage and dispensing systems of the invention in a gas cabinet. In such gas cabinet arrangement involving a multiplicity of sorbent vessels, each of the vessels may be manifolded together for selective delivery of sorbate gas from one or more of such vessels. The cabinet may further include therein independent thermocouples, or other temperature sensing/monitoring equipment and components, for preventing overheating of the vessels and/or other internal components of the gas cabinet, in use thereof.

Such gas source cabinet may additionally include a fusible link heater element for selective augmentive heating of the vessels and sorbent therein; a sprinkler system; an exhaust heat sensor; a toxic gas monitor which functions to shut down the apparatus when toxic gas is sensed; a scrubber or bulk sorption device; and redundant pressure and temperature control means. With such a storage and delivery system apparatus, delivery rates of gas of 500 sccm at 15 psig are readily attainable.

The storage and dispensing system of the present invention may be operatively connected with any suitable downstream process, for utilization of the dispensed gas. For example, the storage and dispensing system may be joined in flow supply relationship to an ion implantation chamber, a silicon semiconductor processing plant, a compound semiconductor processing plant, a flat panel display manufacturing facility, organic synthesis equipment, a pharmaceutical manufacturing facility, a dispensing mask for anaesthesia gas, and air treatment or water pollution abatement facility, a stove or burner in the case of cooking gases, or any other suitable downstream means or process facility, for end use of the gas dispensed from the storage and dispensing system of the invention.

The storage and dispensing system of the invention may be practiced with a wide variety of sorbent materials, of widely varying pore size, porosity, morphology, and chemical composition.

The storage and dispensing system of the invention may be utilized for delivery of liquids as well as gases, vapors, multicomponent and multiphase fluid streams, etc. The storage and dispensing system may also be employed for dispensing of sublimable solids, and the storage and dispensing system may be coupled with reaction vessels serving to react the dispensed fluid to an intermediate or final product for ultimate usage. For example, the storage and dispensing system may dispense boran trifluoride gas to a downstream hydrogenation chamber, in which the boran trifluoride is contacted under appropriate reaction conditions with a hydrogenating agent such as magnesium hydride, to yield diborane, for subsequent use, e.g., ion implantation, doping, or other usage.

Ion implantation is a particularly preferred application for the storage and dispensing system of the invention, and in the dispensing of diborane, germane, silicon tetrafluoride, and antimony-containing gases.

For thermally assisted desorption of the sorbable fluid from the sorbent bed in the storage and dispensing vessel, any suitable energy source may be employed to effect such heating, including RF, IR, and UV radiation, ultrasonic and microwave radiation, as well as heating by other direct and indirect means and methods, such as electrical resistance heating, deployment of extended heat transfer surface or heat exchange passages in the sorbent bed, etc.

What is claimed is:

1. An adsorption-desorption apparatus, for storage and dispensing of a sorbable fluid, said apparatus comprising:
   a storage and dispensing vessel constructed and arranged for holding a solid-phase physical sorbent medium, and for selectively flowing fluid into and out of said vessel;
   a solid-phase physical sorbent medium disposed in said storage and dispensing vessel at an interior gas pressure;
   a sorbable fluid physically adsorbed on said solid-phase physical sorbent medium; and
   a dispensing assembly coupled in gas flow communication with the storage and dispensing vessel, and constructed and arranged:
   (I) to provide, exteriorly of said storage and dispensing vessel, a pressure below said interior pressure, to effect desorption of sorbable fluid from the solid-phase physical sorbent medium, and fluid flow of desorbed fluid through the dispensing assembly; and/or
   (II) to flow thermally desorbed fluid therethrough, and comprising means for heating the sorbent medium to effect desorption of the fluid therefrom, so that the desorbed fluid flows from the vessel into the dispensing assembly,
   wherein the apparatus is characterized by at least one of the following characteristics (i)-(iii):
   (i) the sorbent medium has a Percent Desorbable Sorbate for arsine gas of at least 15%;
   (ii) the sorbent medium has a Sorbent Working Capacity, measured for arsine gas at 40 Torr and at 650 Torr, of at least 50; and
   (iii) the apparatus constitutes a compact, portable, point-of-use source fluid storage and dispensing system, and said interior gas pressure is less than 1200 Torr.

2. An adsorption-desorption apparatus according to claim 1, wherein said sorbable fluid is selected from the group consisting of gas, vapor, liquid, multiphase fluid, and fluid mixtures.

3. An adsorption-desorption apparatus according to claim 1, wherein said sorbent medium is in a form selected from the group consisting of beads, granules, pellets, tablets, powders, particulates, extrudates, cloth or web form materials, honeycomb matrix monolith, composites of the sorbent with other components, comminuted forms of the foregoing, and crushed forms of the foregoing.

4. An adsorption-desorption apparatus according to claim 1, wherein said sorbent medium is selected from the group consisting of polymers, aluminum phosphosilicate, clays, zeolites, porous silicon, honeycomb matrix materials, and carbon materials.

5. An adsorption-desorption apparatus according to claim 1, wherein said sorbable fluid is selected from the group consisting of silane, diborane, arsine, phosphine, phosgene, chlorine, $BCl_3$, $BF_3$, $B_2D_6$, tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, deuterated hydrides, halide gaseous compounds, organo compounds, and organometallic compounds.

6. An adsorption-desorption apparatus according to claim 1, wherein said sorbent medium is selected from the group consisting of zeolites and carbon sorbents.

7. An adsorption-desorption apparatus according to claim 1, wherein said sorbent medium comprises activated carbon.

8. An adsorption-desorption apparatus according to claim 1, wherein said sorbent medium comprises bead activated carbon.

9. An adsorption-desorption apparatus according to claim 8, wherein said bead activated carbon has a diameter in the range of from about 0.1 to about 1 centimeter.

10. An adsorption-desorption apparatus according to claim 1, wherein said sorbent medium has a major fraction of its pore volume, comprised of pores with a diameter in the range of from about 2 Angstroms to 100 Angstroms.

11. An adsorption-desorption apparatus according to claim 1, wherein said sorbent medium has an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) of at least |
|---|---|
| 25 | 30 |
| 50 | 62 |
| 100 | 105 |
| 200 | 145 |
| 300 | 168 |
| 400 | 177 |
| 500 | 185 |
| 550 | 188 |
| 650 | 192. |

12. An adsorption-desorption apparatus according to claim 1, wherein said sorbent medium has an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) |
|---|---|
| 25 | 30–106 |
| 50 | 62–138 |
| 100 | 105–185 |
| 200 | 145–232 |
| 300 | 168–263 |
| 400 | 177–288 |
| 500 | 185–308 |
| 550 | 188–315 |
| 650 | 192–330. |

13. An adsorption-desorption apparatus, for storage and dispensing of a sorbable fluid, said apparatus comprising:

a storage and dispensing vessel constructed and arranged for holding a solid-phase physical sorbent medium, and for selectively flowing fluid into and out of said vessel;

a solid-phase physical sorbent medium disposed in said storage and dispensing vessel at an interior gas pressure;

a sorbable fluid physically adsorbed on said solid-phase physical sorbent medium; and a dispensing assembly coupled in gas flow communication with the storage and dispensing vessel, and constructed and arranged:

(i) to provide, exteriorly of said storage and dispensing vessel, a pressure below said interior pressure, to effect desorption of sorbable fluid from the solid-phase physical sorbent medium, and fluid flow of desorbed fluid through the dispensing assembly; and/or (ii) to flow thermally desorbed fluid therethrough, and comprising means for heating the sorbent medium to effect desorption of the fluid therefrom, so that the desorbed fluid flows from the vessel into the dispensing assembly, wherein the sorbent medium is characterized by a Percent Desorbable Sorbate for arsine gas of at least 15%.

14. (Amended) An adsorption-desorption apparatus, for storage and dispensing of a sorbable fluid, said apparatus comprising:

a storage and dispensing vessel constructed and arranged for holding a solid-phase physical sorbent medium, and for selectively flowing fluid into and out of said vessel;

a solid-phase physical sorbent medium disposed in said storage and dispensing vessel at an interior gas pressure;

a sorbable fluid physically adsorbed on said solid-phase physical sorbent medium; and a dispensing assembly coupled in gas flow communication with the storage and dispensing vessel, and constructed and arranged:

(i) to provide, exteriorly of said storage and dispensing vessel, a pressure below said interior pressure, to effect desorption of sorbable fluid from the solid-phase physical sorbent medium, and fluid flow of desorbed fluid through the dispensing assembly; and/or (ii) to flow thermally desorbed fluid therethrough, and comprising means for heating the sorbent medium to effect desorption of the fluid therefrom, so that the desorbed fluid flows from the vessel into the dispensing assembly, wherein the sorbent has a Sorbent Working Capacity, measured for arsine gas at 40 Torr and at 650 Torr, at least 50.

15. A compact, portable, point-of-use adsorption-desorption apparatus, for storage and dispensing of a sorbable fluid, said apparatus comprising:

a storage and dispensing vessel constructed and arranged for holding a solid-phase physical sorbent medium, and for selectively flowing fluid into and out of said vessel;

a solid-phase physical sorbent medium disposed in said storage and dispensing vessel at an interior gas pressure not exceeding 1200 Torr;

a sorbable fluid physically adsorbed on said solid-phase physical sorbent medium; and a dispensing assembly coupled in gas flow communication with the storage and dispensing vessel, and constructed and arranged:

(i) to provide, exteriorly of said storage and dispensing vessel, a pressure below said interior pressure, to effect desorption of sorbable fluid from the solid-phase physical sorbent medium, and fluid flow of desorbed fluid through the dispensing assembly; and/or (ii) to flow thermally desorbed fluid therethrough, and comprising means for heating the sorbent medium to effect desorption of the fluid therefrom, so that the desorbed fluid flows from the vessel into the dispensing assembly.

16. An adsorption-desorption apparatus according to claim 15, wherein said sorbable fluid is selected from the group consisting of gas, vapor, liquid, multiphase fluid, and fluid mixtures.

17. An adsorption-desorption apparatus according to claim 15, wherein said sorbent medium is in a form selected from the group consisting of beads, granules, pellets, tablets, powders, particulates, extrudates, cloth or web form materials, honeycomb matrix monolith, composites of the sorbent with other components, comminuted forms of the foregoing, and crushed forms of the foregoing.

18. An adsorption-desorption apparatus according to claim 15, wherein said sorbent medium is selected from the group consisting of polymers, aluminum phosphosilicate, clays, zeolites, porous silicon, honeycomb matrix materials, and carbon materials.

19. An adsorption-desorption apparatus according to claim 15, wherein said sorbable fluid is selected from the group consisting of silane, diborane, arsine, phosphine, phosgene, chlorine, $BCl_3$, $BF_3$, $B_2D_6$, tungsten hexafluoride, hydrogen fluoride, hydrogen chloride, hydrogen iodide, hydrogen bromide, germane, ammonia, stibine, hydrogen sulfide, hydrogen cyanide, hydrogen selenide, hydrogen telluride, deuterated hydrides, halide gaseous compounds, organo compounds, and organometallic compounds.

20. An adsorption-desorption apparatus according to claim 15, wherein said sorbent medium is selected from the group consisting of zeolites and carbon sorbents.

21. An adsorption-desorption apparatus according to claim 15, wherein said sorbent medium comprises activated carbon.

22. An adsorption-desorption apparatus according to claim 15, wherein said sorbent medium comprises bead activated carbon.

23. An adsorption-desorption apparatus according to claim 22, wherein said bead activated carbon has a diameter in the range of from about 0.1 to about 1 centimeter.

24. An adsorption-desorption apparatus according to claim 15, wherein said sorbent medium has a major fraction of its pore volume, comprised of pores with a diameter in the range of from about 2 Angstroms to 100 Angstroms.

25. An adsorption-desorption apparatus according to claim 15, wherein said sorbent medium has an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) of at least |
|---|---|
| 25 | 30 |
| 50 | 62 |
| 100 | 105 |
| 200 | 145 |
| 300 | 168 |
| 400 | 177 |
| 500 | 185 |
| 550 | 188 |
| 650 | 192. |

26. An adsorption-desorption apparatus according to claim 15, wherein said sorbent medium has an arsine gas adsorption isotherm at 25° C., measured in grams of arsine adsorbed per liter of the sorbent, as a function of pressure in Torr, with the following adsorption loading characteristic:

| Pressure, Torr | Loading (grams of arsine per liter of sorbent) |
|---|---|
| 25 | 30–106 |
| 50 | 62–138 |
| 100 | 105–185 |
| 200 | 145–232 |
| 300 | 168–263 |
| 400 | 177–288 |
| 500 | 185–308 |
| 550 | 188–315 |
| 650 | 192–330. |

* * * * *

UNITED STATES PATENT AND TRADEMARK OFFICE
CERTIFICATE OF CORRECTION

PATENT NO. : 5,704,967
DATED : January 6, 1998
INVENTOR(S) : Tom et al.

It is certified that error appears in the above-indentified patent and that said Letters Patent is hereby corrected as shown below:

Column 5, Line 21      change "amine" to -- arsine --.

Column 22, Line 51      change "higher am" to -- higher are --.

Signed and Sealed this

Twenty-ninth Day of September, 1998

Attest:

BRUCE LEHMAN

*Attesting Officer*      *Commissioner of Patents and Trademarks*